United States Patent Office 2,950,924
Patented Aug. 30, 1960

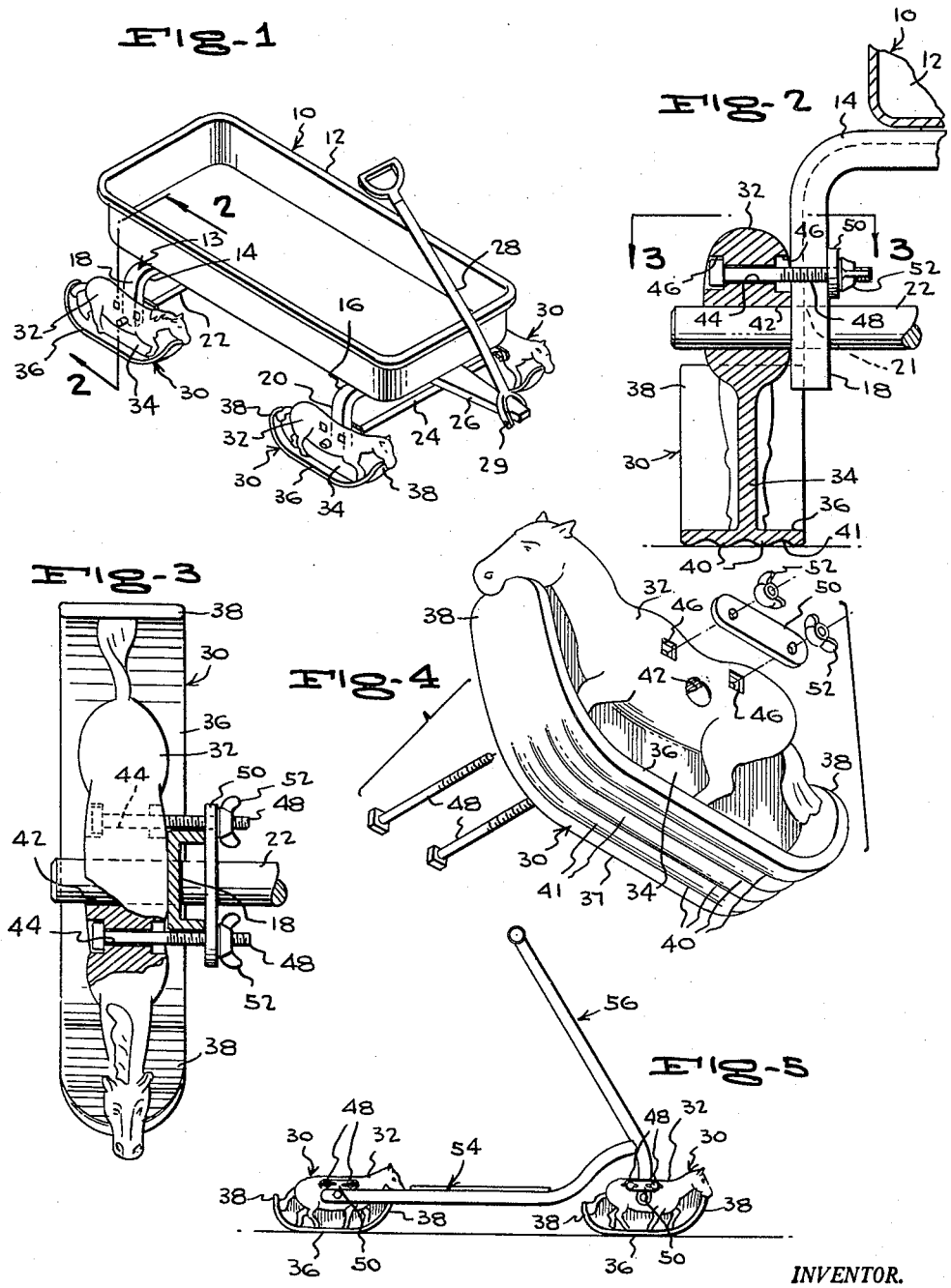

2,950,924

REMOVABLE RUNNERS FOR VEHICLES

Emmett J. Gantz, 1007 S. 14th St., Burlington, Iowa

Filed Feb. 25, 1959, Ser. No. 795,408

5 Claims. (Cl. 280—14)

This invention relates generally to devices for supporting vehicles for movement. More particularly, the invention has reference to runners, designed especially for detachable mounting upon the axles of wagons, scooters, tricycles, and other vehicles used in play by children.

The present application, in this connection, comprises a continuation-in-part of my co-pending application Serial No. 674,421, filed July 26, 1957, now abandoned.

The main object of the present invention is to provide a generally improved runner construction of the type referred to in the mentioned, co-pending application. In that application, there was shown a plurality of runners, adapted to be mounted upon the axles of vehicles of the kind hereinbefore mentioned. The runners shown in the specified application included body portions formed with runner shoes, said body portions having openings receiving the ends of the vehicle axles. Projecting laterally from the inner sides of the body portions were stop lugs, each body portion including a pair of said lugs embracing a depending wheel hanger or equivalent axle support member of the vehicle frame. In this way, the runners were held against rockable movement about the axles, and in addition, were retained in their assigned positions by means of cotter pins extending through end openings of the axles.

In the present application, the basic characteristics of the runners, with respect to their use as conversion devices replacing the ordinary vehicle wheels, are retained. Thus, in the instant case, the runners are engaged on the axles, with adjacent axle support members, in such a way as to hold the runners against movement about the axles.

An important object of the present invention is to provide, in runners of the character described, an improved means for mounting the same upon the vehicle, such that each runner has a positive connection to the adjacent axle support member, such as to fixedly attach the runner to said support member, with the runner thus being held against rockable movement about the axle that extends through the body part of the runner. By reason of the direct connection of the device to the adjacent axle support member, the device itself grips the axle, in such a way as to hold the device against slippage off the axle without the requirement of cotter pins or of equivalent devices. The gripping of the axle by the body part of the device, in this connection, in turn holds the axle against relative longitudinal displacement in respect to the vehicle frame and the sled runners carried by the axle. In this way, all components of the structure are held rigidly in their assembled relation, without the requirement of cotter pins or equivalent means on the axle.

Another object is to achieve the highly desirable results outlined above, while, at the same time, permitting the device to be attached or detached with maximum speed and ease, and without the requirement of special tools.

Another object of importance is to provide a device of the character stated so designed that a maximum safety characteristic will be imparted thereto, by reason of the fact that the mounting of the device results in its being firmly, immovably secured to the adjacent structural members of the vehicle, in such a way as to prevent accidental tipping of the vehicle that might otherwise result if there were even a small amount of rocking or other movement of the sled runners.

Another object is to incorporate, in the construction of the runner shoes, anti-slip means which will reduce to a minimum the possibility of lateral slippage of the runners upon snow or other surfaces of a slippery nature.

Still another object of importance is to provide a runner of the character stated that can be used on any of various types of vehicles ordinarily equipped with wheels, such as two-wheeled scooters, tricycles, etc.

Still another object is to provide a sled runner device of the character stated which will be so designed as to be mountable upon vehicles of different types without requiring any modification or re-design of the runner. Thus, one form of the runner is universally usable, by reason of the fact that the runner includes a particular type of clamping assembly designed to be swiftly adjustable for accommodating the same to axle support members of various widths, said clamp assembly further comprising a lateral projection that may be used for engaging against the frame of a scooter or similar vehicle.

Still another object is to provide a sled runner as described which, by reason of the particular form and relative arrangement of the component parts thereof, will be capable of manufacture in one form that will be usable on both sides of the vehicle, thus eliminating the necessity of making "lefts" and "rights."

Another object is to provide a sled runner conversion device as described that will include a body portion in the simulation of an animal, so designed that a runner shoe secured to the body portion will be braced at all locations along its length by connections that extend to the body portion.

Other objects will appear from the following description, the claims appended thereto, and from the annexed drawing, in which like reference characters designate like parts throughout the several views, and wherein:

Figure 1 is a perspective view of a wagon equipped with sled runners according to the present invention;

Figure 2 is an enlarged transverse sectional view substantially on line 2—2 of Figure 1;

Figure 3 is a view on the same scale as Figure 2, taken on line 3—3 of Figure 2, with the runner being shown in top plan, a portion of the runner being broken away;

Figure 4 is an exploded perspective view of one of the runners per se, on a scale enlarged above that of Figure 1; and Figure 5 is a side elevational view showing the invention incorporated in a scooter.

Referring to the drawing in detail, generally designated at 10 is a wagon, having the usual body 12, mounted upon a frame generally designated 13, which frame includes rear and front, channeled crossbars 14, 16 respectively. The crossbars are each provided with depending extensions at the sides of the vehicle, said depending extensions of the rear crossbar being designated at 18 and the corresponding extensions of the front crossbar being designated 20. The extensions comprise axle support members or wheel hangers, and are formed adjacent their lower ends with apertures 21. Engaged in the apertures of the rear axle support members 18 is a rear axle 22, while a front axle 24 is similarly engaged in the apertures of the front axle support members.

It will be understood that the front portion of the frame is steerable, that is, the axle 24, and the front crossbar 16, are conjointly turnable, through the provision of a tongue 26 that projects forwardly from and is secured to the crossbar 16. A wagon handle 28 is pivotally connected at 29 to tongue 26, in the usual manner.

All this is completely conventional in a wagon, and in and of itself does not constitute part of the present invention. Ordinarily, the wagon would be equipped with wheels, not shown, but when it is desired to convert the wagon to a sled-like vehicle, one simply removes the wheels and mounts in their place the runners 30 comprising the present invention.

All the runners are identical, so that the description of one will suffice for all.

Each runner 30 includes a body part 32 which can be of cast construction. The body part, in the preferred embodiment of the invention, is in the simulation of a trotting horse, thus to add to the attractiveness thereof so far as the children are concerned. In this regard, it will be understood that the body part can have any of various animal shapes, other than that shown.

The body part 32 includes a web 34 in a vertical plane (Figure 2) and integral with the lower edge of the web is a relatively wide, elongated runner shoe 36, having a generally planiform intermediate portion 37 and end portions 38 that curve upwardly outwardly from the opposite ends of the intermediate portion.

The front portion of the runner shoe extends up to and into the lower portion of the simulated animal's jaw. The web completely fills the space between the body part 32 and shoe 36 from end-to-end of the shoe. Therefore, there is no chance of the end of the shoe being hooked, bent, or snapped off, if the person operating the sled should strike the curbing. There is thus a particular, highly desirable cooperation between the shoe 36, body part 32, and web 34, wherein the body part forms a thick backing or strengthening rib for the shoe, reinforcing the shoe for the full length thereof through the medium of the web.

As shown in Figure 4, the other side of the shoe 36 is formed with integral, longitudinal, parallel ribs 40, defining therebetween longitudinal grooves or recesses 41. The ribs extend over the full length of the intermediate portion, and part-way along the end portions 38. The ribs minimize the possibility of lateral slippage of the vehicle, during its movement.

Substantially centrally formed in the body part 32 is a transverse, through, axle-receiving opening 42. Above opening 42 and at opposite sides thereof are transverse, through bores 44. Each bore 44 at its opposite ends (see Figure 2) is formed with non-circular counterbores or recesses 46.

Removably inserted in the bores 44 are elongated support pins 48. In the illustrated example these comprise headed bolts, and since the bores 44 are smooth-walled, with the bolts 48 being loosely, slidably inserted therein, it is possible to reverse the bolts end-for-end, so as to cause the bolts to project from either side of the body part. In this way, "lefts" or "rights" are eliminated. This reduces, it will be appreciated, the cost of manufacture to a considerable extent.

In each position of a bolt, its head will be engaged in one or the other of the recesses 46.

The support pins project laterally outwardly from the selected side of the body part, and freely slidable upon the projecting portions of the support pins are plate elements 50. The plate elements are freely adjustable toward and away from the adjacent side of the body part, upon the support pins 48. In this way, each plate element cooperates with its associated body part in clampingly engaging therebetween an associated axle support member 18.

Nuts 52 are threaded upon the pins 48, bearing against the plate element, thus to limit the plate element against movement laterally outwardly from the body part, beyond a selected, spaced relationship in respect to the body part. The nuts, when threaded toward the body part, cause the plate element and body part to firmly, clampingly engage therebetween the associated axle support member.

By reason of the arrangement illustrated and described, it will be seen that cotter pins and equivalent means, ordinarily required upon the ends of the axle, may be dispensed with. One merely removes the wheels of the vehicle, after which the runners are positioned upon the end portions of the axle. The support pins 48 are disposed at opposite sides of the axle support member as shown in Figure 3, being disposed in contacting relation with the respective, opposite sides of said support member. The plate element 50 is engaged against the inner side of the support member, and cooperates with the body part in clamping the support member between the plate element and the body part.

In this way, the device is fixedly connected to the support member, so as to be securely held against any possibility of slippage off the axle. The device, in fact, is immovably, yet detachably connected to the vehicle, so that the axle, axle support member, and the runner are all held against movement in respect to one another.

It is also to be noted that with the clamping means left somewhat loose, the device can be moved upwardly along the axle support member, and in this way, the top portion of the axle may be caused to bind against the top part of the aperture 21 of the axle support member, with the bottom portion of the axle bearing against the bottom part of the opening 42 of the body part. Then, the clamping means is tightened. The axle is thus frictionally bound, at diametrically opposite locations thereon, with the axle support member and body part respectively. The axle is thus held against endwise displacement, and it will be understood that the holding of the axle against said displacement is heightened even more when weight is imposed upon the body of the vehicle, as it would be during normal use of the vehicle.

The arrangement has desirable characteristics, in that it can be utilized to advantage on any of various vehicles, as for example the scooter shown in Figure 5. In the Figure 5 arrangement the plate element is directly against the body part, being disposed in longitudinally contacting relation to the rear portion of the frame 54 of the scooter 56. At the front of the scooter, the runner there used is engaged with a depending axle support member of the scooter frame, in the same manner as shown in Figure 2 for the wagon 10.

The invention can, of course, also be used on various other types of vehicles, as desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. A removable runner for use as one of a set upon a vehicle that includes a plurality of axles and axle support members with which the several runners of the set are to be engaged, comprising: a body part having an opening for receiving an axle; a runner shoe on the body part; and means at one side of the body part engageable with an adjacent axle support member for holding the body part against rockable movement about said axle, including spaced, threaded support pins removably engaged in and projecting laterally outwardly from said side of the body part, a plate element extending between the pins and mounted thereon for slidable adjustment toward and away from said body part, said plate element, pins, and body part together defining an opening at said side of the body part for receiving said adjacent support member with the support member embraced by the pins in contact therewith, and nuts threaded on the pins and bearing against the plate element for limiting the same against movement laterally outwardly from the body part beyond a selected position of adjustment in which the plate element is spaced laterally outwardly from the body part to clampingly engage therebetween said adjacent support member.

2. A removable runner for use as one of a set upon a vehicle that includes a plurality of axles and axle support members with which the several runners of the set are to be engaged, comprising: a body part having an opening for receiving an axle; a runner shoe on the body part; and means at one side of the body part engageable with an adjacent axle support member for holding the body part against rockable movement about said axle, including a pair of spaced, threaded support pins removably engaged in and projecting laterally outwardly from said side of the body part above the axle receiving opening at opposite sides of the opening, a plate element extending in general parallelism with said side of the body part between the pins and mounted on the pins for slidable adjustment toward and away from said body part, said plate element, pins, and body part together defining an opening at said side of the body part for receiving said adjacent support member with the support member embraced by the pins in contact therewith, and nuts threaded on the pins and bearing against the plate element for limiting the same against movement laterally outwardly from the body part beyond a selected position of adjustment in which the plate element is spaced laterally outwardly from the body part and cooperates therewith in clampingly engaging between the same said adjacent axle support member.

3. A removable runner as in claim 2, wherein the body part has transverse bores extending completely therethrough for receiving the respective support pins, said pins having heads of other than circular form and said bores having at their respective, opposite ends recesses complementary to the heads, whereby to permit reversal of the pins end-for-end within the bores, the heads of the pins engaging in recesses of the body part on insertion of the pins in the bores in a selected direction to hold the pins against rotatable movement within the bores.

4. A removable runner for use as one of a set of like runners comprising, in combination with a vehicle including a plurality of axles and depending axle support members having apertures receiving the axles: a body part having an opening receiving an adjacent one of the axles; a runner shoe on the body part; and means at one side of the body part engaging an adjacent axle support member and holding the body part against movement in respect to said associated axle and axle support member, including a pair of spaced, threaded support pins removably engaged in and projecting laterally outwardly from said side of the body part above the axle-receiving opening thereof, a plate element extending in general parallelism with said side of the body part between the pins and mounted upon the pins for slidable adjustment toward and away from said side of the body part, said plate element, pins, and body part together defining an opening at said side of the body part in which said adjacent support member is received with the support member in contact at its several sides with the body part, plate element, and pins, and nuts threaded on the pins exteriorly of said last-named opening and bearing against the plate element for limiting the same against movement laterally outwardly from the body part beyond a selected position of adjustment in which the plate element cooperates with the body part in clampingly engaging therebetween said adjacent axle support member.

5. A removable runner as in claim 4, wherein, on backing of the nuts away from the plate element upon said pins, the support member is freed for up-and-down movement within the last-named opening, whereby to be movable relative to the body part in a direction tending to offset the aperture of the support member from the axle-receiving opening of the body part, whereby to bind the axle in the body part and said axle support member against endwise displacement, responsive to clamping engagement of the support member between the body part and plate element.

References Cited in the file of this patent

UNITED STATES PATENTS

| | | |
|---|---|---|
| D. 59,797 | Wakeham | Nov. 22, 1921 |
| 1,108,160 | Field et al. | Aug. 25, 1914 |
| 1,391,083 | Stich | Sept. 20, 1921 |
| 1,409,501 | Volz | Mar. 14, 1922 |
| 1,592,419 | Campbell | July 13, 1926 |
| 2,388,145 | Heagney | Oct. 30, 1945 |
| 2,593,025 | Hanson et al. | Apr. 15, 1952 |
| 2,598,682 | Giovanonni | June 3, 1952 |